United States Patent
Ko et al.

(10) Patent No.: US 11,918,981 B2
(45) Date of Patent: Mar. 5, 2024

(54) PEROVSKITE METAL OXIDE CATALYST, IN WHICH METAL ION IS SUBSTITUTED, FOR REDUCING CARBON DEPOSITION, PREPARATION METHOD THEREFOR, AND METHANE REFORMING REACTION METHOD USING SAME

(71) Applicant: INDUSTRY FOUNDATION OF CHONNAM NATIONAL UNIVERSITY, Gwangju (KR)

(72) Inventors: Chang Hyun Ko, Daejeon (KR); Ji Yoon Jeon, Hamyang-gun (KR); Jeong Woo Yun, Gwangju (KR); Eun Gyong Park, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 690 days.

(21) Appl. No.: 16/648,190

(22) PCT Filed: Nov. 6, 2017

(86) PCT No.: PCT/KR2017/012452
§ 371 (c)(1),
(2) Date: Mar. 17, 2020

(87) PCT Pub. No.: WO2019/054557
PCT Pub. Date: Mar. 21, 2019

(65) Prior Publication Data
US 2020/0269217 A1 Aug. 27, 2020

(30) Foreign Application Priority Data
Sep. 18, 2017 (KR) .................. 10-2017-0119442

(51) Int. Cl.
*B01J 23/78* (2006.01)
*B01J 23/00* (2006.01)
*B01J 37/04* (2006.01)
*B01J 37/08* (2006.01)
*C01B 3/40* (2006.01)

(52) U.S. Cl.
CPC ............. *B01J 23/78* (2013.01); *B01J 23/002* (2013.01); *B01J 37/04* (2013.01); *B01J 37/088* (2013.01); *C01B 3/40* (2013.01); *C01B 2203/0233* (2013.01); *C01B 2203/0238* (2013.01); *C01B 2203/0261* (2013.01); *C01B 2203/1058* (2013.01); *C01B 2203/1241* (2013.01)

(58) Field of Classification Search
CPC . B01J 23/78; B01J 23/002; B01J 37/04; B01J 37/088; C01B 3/40; C01B 2203/0233; C01B 2203/0238; C01B 2203/0261; C01B 2203/1058; C01B 2203/1241

USPC ......................................................... 252/373
See application file for complete search history.

(56) References Cited

U.S. PATENT DOCUMENTS

| | | | | |
|---|---|---|---|---|
| 3,330,697 A | * | 7/1967 | Pechini | H01G 4/12 |
| | | | | 423/594.12 |
| 9,675,962 B2 | | 6/2017 | Wang et al. | |
| 2009/0202869 A1 | * | 8/2009 | Sawaki | C01B 32/05 |
| | | | | 427/215 |
| 2012/0161078 A1 | * | 6/2012 | Saito | B01J 23/78 |
| | | | | 502/328 |
| 2012/0189536 A1 | * | 7/2012 | Wang | B01J 37/033 |
| | | | | 502/328 |
| 2016/0075937 A1 | * | 3/2016 | Cannan | C09K 8/80 |
| | | | | 166/250.1 |
| 2017/0007988 A1 | * | 1/2017 | Choung | B01J 35/002 |

FOREIGN PATENT DOCUMENTS

| | | |
|---|---|---|
| CN | 103933991 A | 7/2014 |
| KR | 1020100098068 A | 9/2010 |
| KR | 101447681 B1 | 10/2014 |
| KR | 1020150133574 A | 11/2015 |

OTHER PUBLICATIONS

Synthesis and Characterization of Pure and Nickel-doped SrTiO3 nanoparticles via solid state reaction route G. Viruthagiri et al Indian Journal of Advances in Chemical Science, v1, No. 3, pp. 132-138 (Year: 2013).*
Structural position and oxidation state of nickel in SrTiO3 Irina A. Sluchinskaya et al. J Advanced Dielectrics, v3, No. 4 pp. 1-7 (Year: 2013).*
Synthesis and characterization of highly-active nickel and lanthanum co-doped SrTiO3 Aizhong Jia et al. Solid State Sciences, v12, pp. 1140-1145 (Year: 2010).*
Preparation and characterization of nickel-based mixed-oxides and their performance for catalytic methane decomposition M.E. Rivas et al Catalysis Today, v133-135, pp. 367-373 (Year: 2008).*

(Continued)

*Primary Examiner* — Douglas B Call
(74) *Attorney, Agent, or Firm* — STIP Law Group, LLC

(57) ABSTRACT

The present invention relates to a perovskite metal oxide catalyst substituted with metal ions for reducing carbon deposition, a method for producing the same, and a process for performing a methane reforming reaction using this catalyst. According to the present invention, a novel type of catalyst is produced in which Ni, iron or cobalt in ionic form is substituted at a portion of the Ti site (B-site) of $SrTiO_3$, $MgTiO_3$, $CaTiO_3$ or $BaTiO_3$, which is a multicomponent metal oxide having a perovskite ($ABO_3$) structure. Then, various methane reforming reactions (e.g., steam-methane reforming (SMR), dry reforming of methane (DRM), catalytic partial oxidation of methane (CPOM), etc.) may be efficiently and economically performed using this catalyst. The nickel-substituted perovskite metal oxide catalyst according to the present invention has a structure in which $Ni^{2+}$, $Co^{2+}$, $Fe^{2+}$, $Co^{3+}$ or $Fe^{3+}$ is substituted in the perovskite lattice structure. Thus, the metal oxide catalyst has advantages in that carbon deposition thereon does not occur, and thus the catalyst has a high catalytic stability and may be used for a long time.

8 Claims, 12 Drawing Sheets

(56) References Cited

OTHER PUBLICATIONS

The partial European search report of EP 21 19 5970, dated Jan. 26, 2022.
Ryuji Shiozaki et al, Partial oxidation of methane over a Ni/BaTiO3 catalyst prepared by solid phase crystallization, Journal of the Chemical Society, FARADAY Transactions, Sep. 1997, vol. 93, No. 17, pp. 3235-3242, Royal Society of Chemistry, Cambridge, United Kingdom.
The extended European search report of 17924929.7, dated Apr. 30, 2021.
Andrew M. Beale et al, Combined experimental and computational modelling studies of the solubility of nickel in strontium titanate, Journal of Materials Chemistry, Jan. 1, 2009, vol. 19, No. 25, p. 4391-4400, The Royal Society of Chemistry, Cambridge, United Kingdom.
Jifei Jia et al, Study on the anti-coking nature of Ni/SrTiO3 catalysts by the CH4 pyrolysis, Catalysis Letters, Jul. 6, 2001, vol. 76, No. 3-4, pp. 183-192, Springer, Berlin, Germany.
K. Takehira et al, Partial Oxidation of methane to synthesis gase over (Ca, Sr) (Ti, Ni) oxides, Catalysis Today, May 23, 1995, vol. 24, No. 3 pp. 237-242, Springer, Berlin, Germany.
International Search Report of PCT/KR2017/012452, dated Jun. 15, 2018, English translation.
Andrew M. Beale et al, Combined experimental and computational modelling studies of the solubility of nickel in strontium titanate, Journal of Materials Chemistry, Apr. 29, 2009, pp. 4391-4400, vol. 19, The Royal Society of Chemistry, London, United Kingdom.
K. Takehira et al, Partial oxidation of methane to synthesis gas over (Ca, Sr) (Ti, Ni) oxides, Catalysis Today, 1995, pp. 237-242, vol. 24, Elsevier, Amsterdam, Netherlands.
Jiyoon Jeon et al, Steam Reforming of Methane using Perovskite Mixed Metal Oxide (SrYTiNiO3): Effect of Steam to Carbon Ratio, In: NAM25 ( North American Catalysis Society), Jun. 2017, P-T-BRM-87, North Ameirca Catalysis Society, Denver, USA.
The extended European search report of EP 21 19 5970, dated May 11, 2022.
Ryuji Shiozaki et al, Partial oxidation of methane over a Ni/BaTiO3 catalyst prepared by solid phase crystallization, J. Chem, Soc., Faraday Trans. 1997, vol. 93, pp. 3236-3242, Royal Society of Chemistry, London, United Kingdom.
Andrew M. Beale et al, Combined experimental and computational modelling studies of the solubility of nickel in strontium titanate, Journal of Materials Chemistry, Apr. 29, 2009, vol. 19, pp. 4391-4400, Royal Society of Chemistry, London, United Kingdom.
Jifei Jia et al, Study on the anti-coking nature of Ni/SrTiO3 catalysts by the CH4 pyrolysis, Catalysis Letters, Jul. 6, 2001, vol. 76, No. 3-4, pp. 183-192, Plenum Publishing Corporation, New York, USA.
Takashi Hayakawa et al, Sustainable Ni/Ca1-xSrxTio3 catalyst prepared in situ for the partial oxidation of methane to synthesis gas, Applied Catalysis A, 1997, vol. 149, pp. 391-410, Elsevier, Amsterdam, Netherlands.
K. Takehira et al, Partial Oxidation of CH4 over Ni/SrTiO3 Catalysts Prepared by a Solid-Phase Crystallization Method, Journal of Catalysis, 2002, vol. 207, pp. 307-316, Elsevier Science (USA), New York City, USA.

* cited by examiner

[Figure 1]
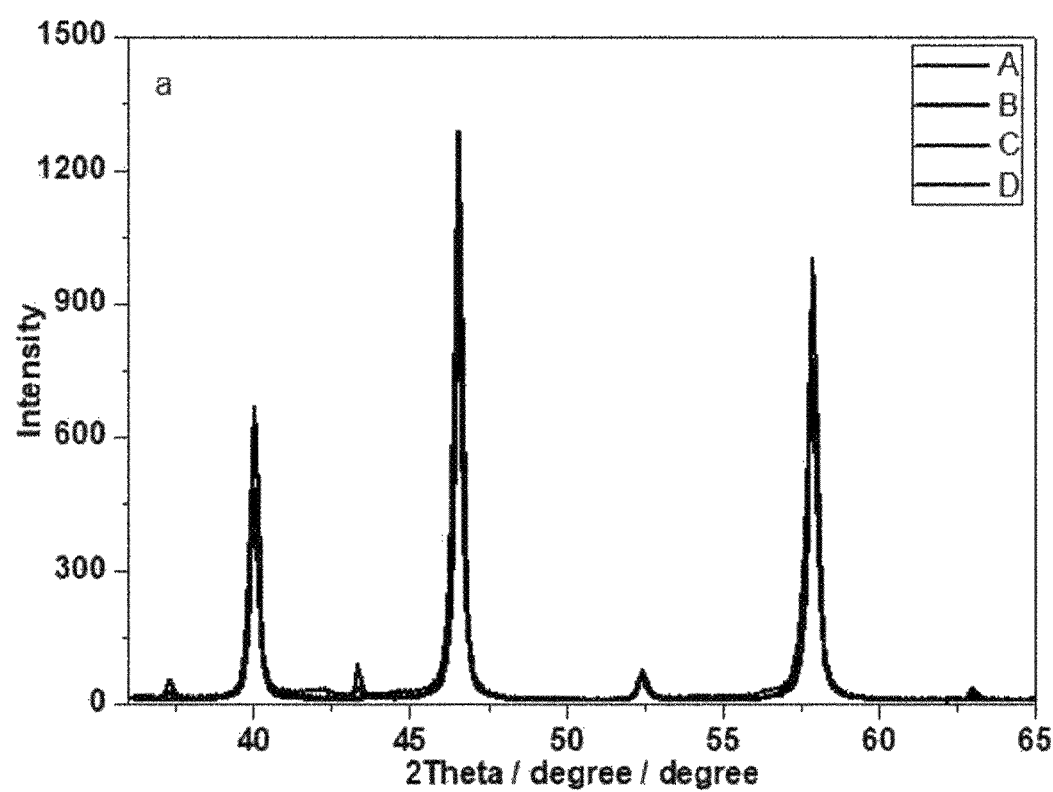

[Figure 2]
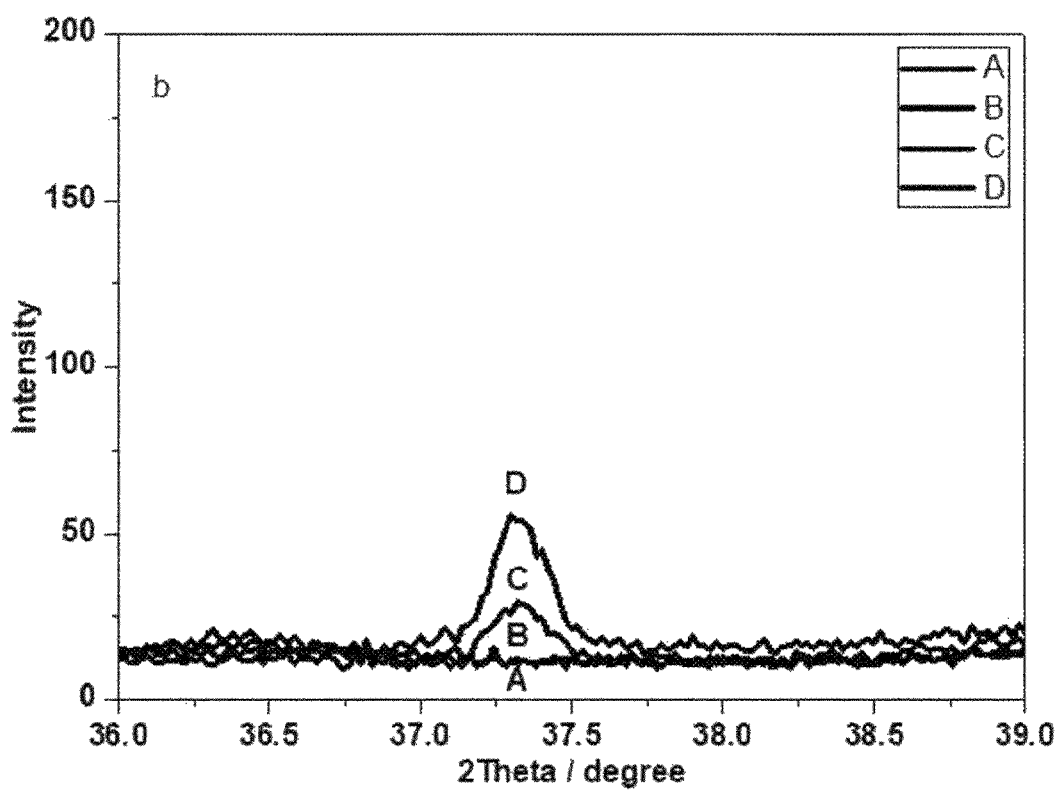

[Figure 3]
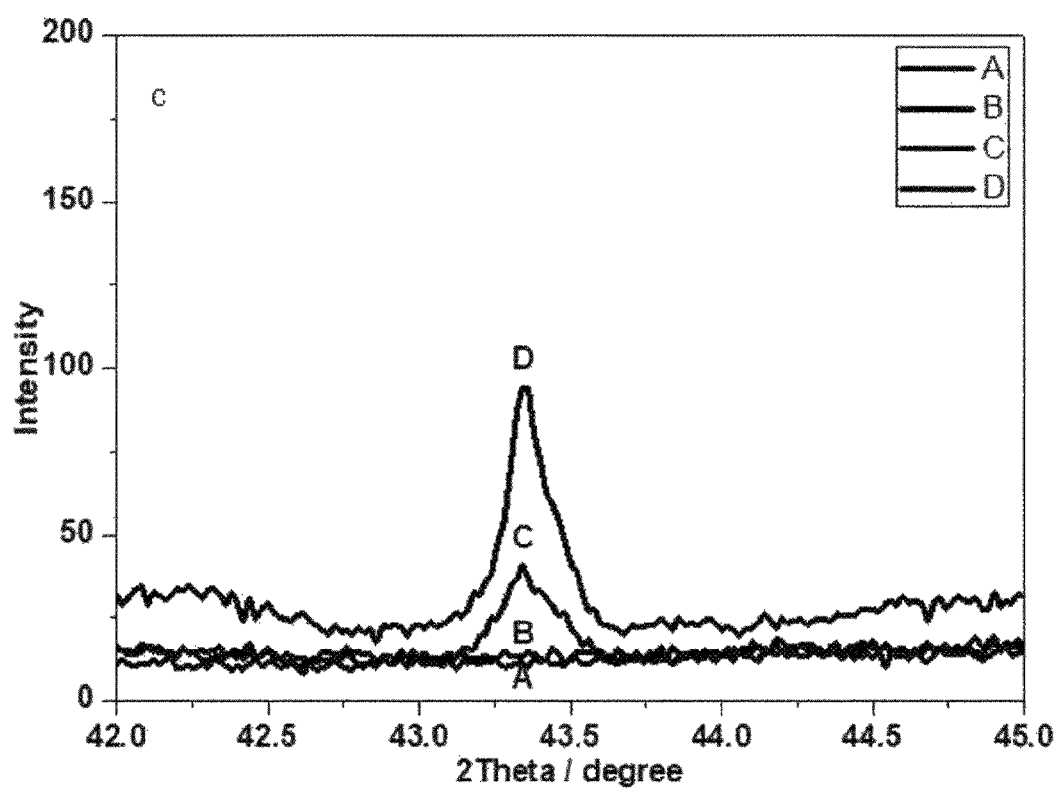

[Figure 4]
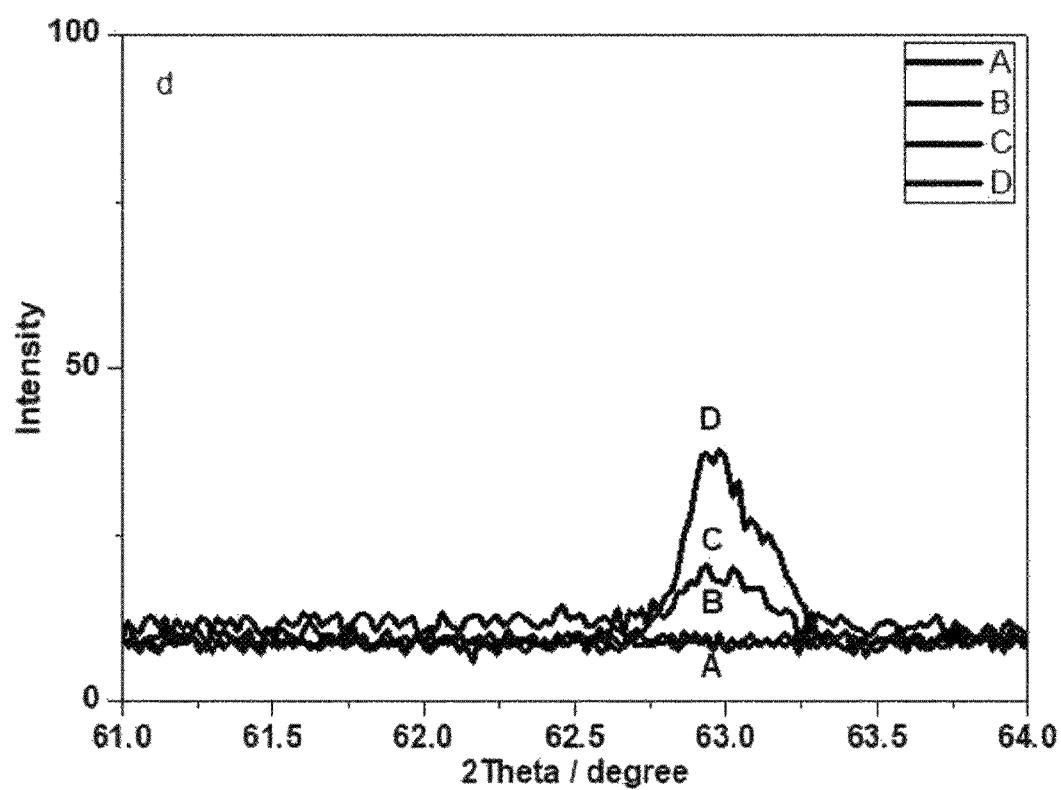

【Figure 5】
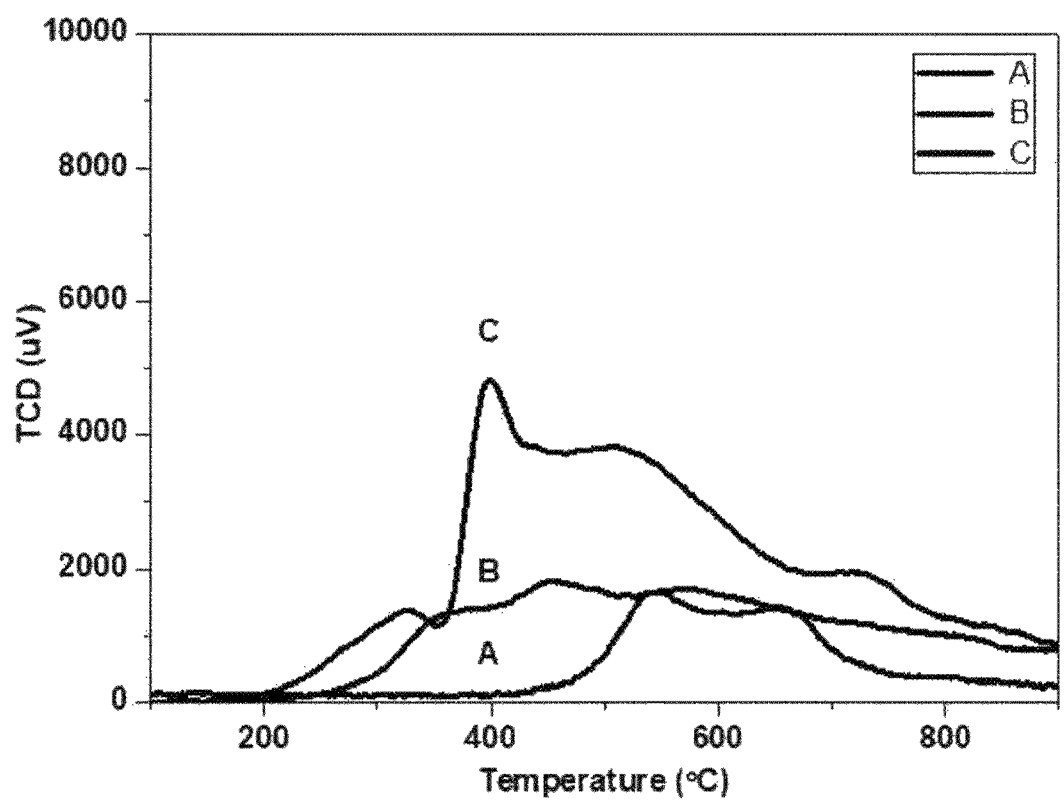

【Figure 6】
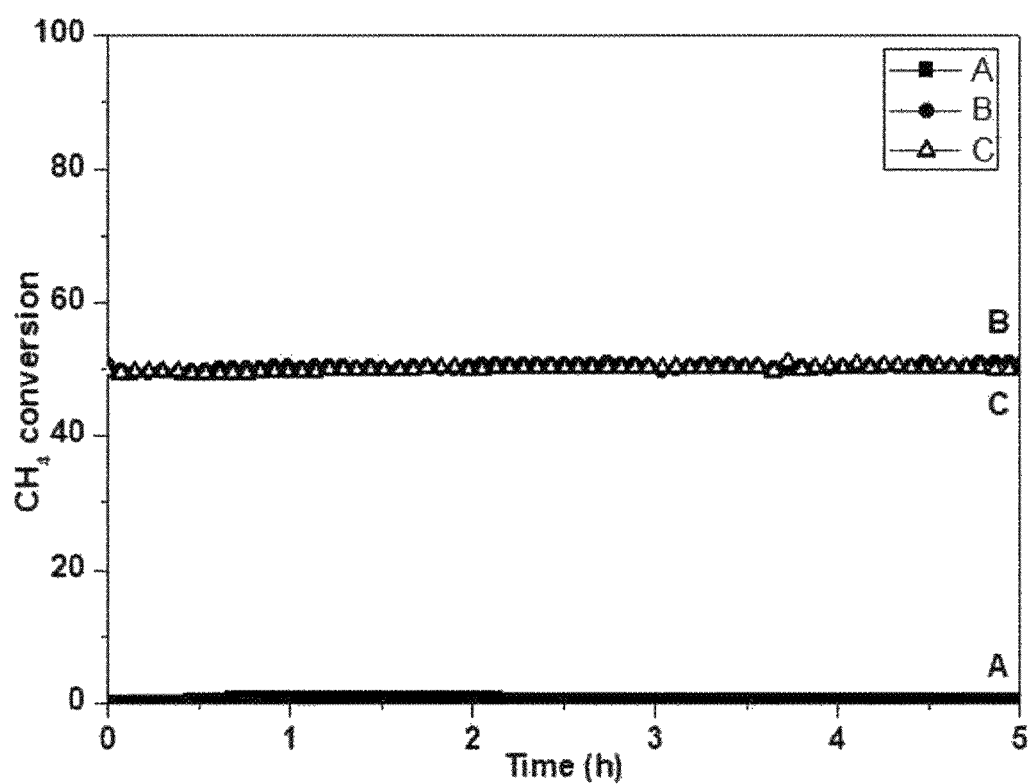

【Figure 7】
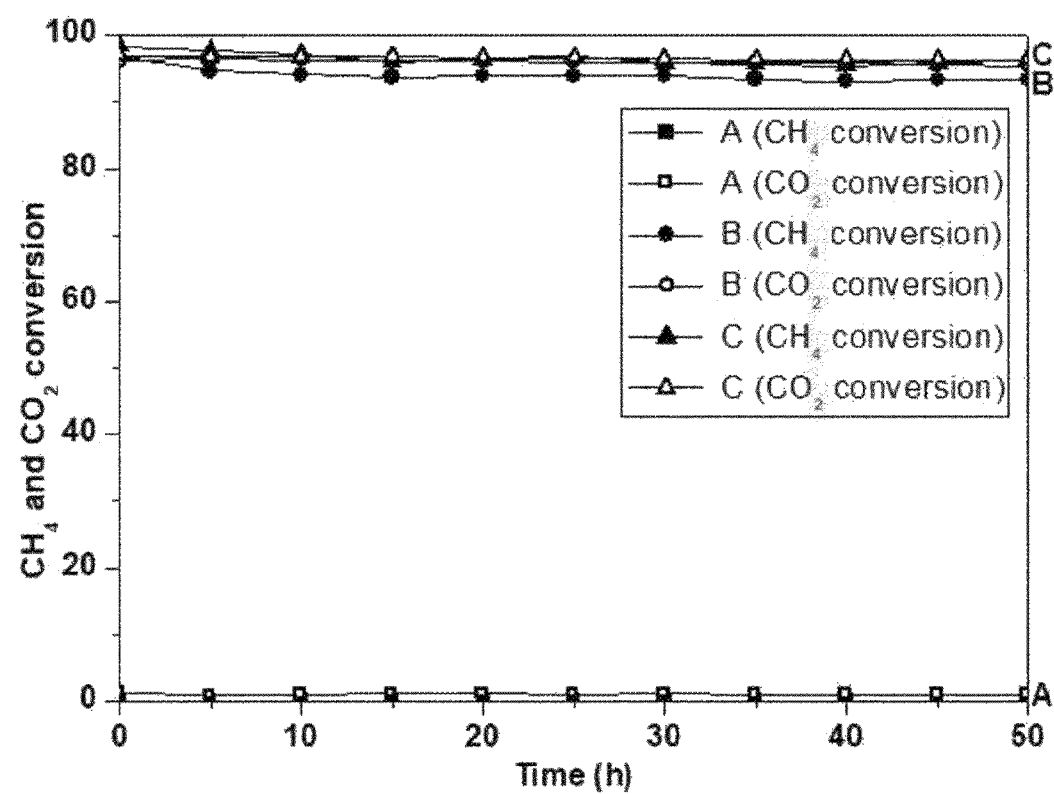

[Figure 8]
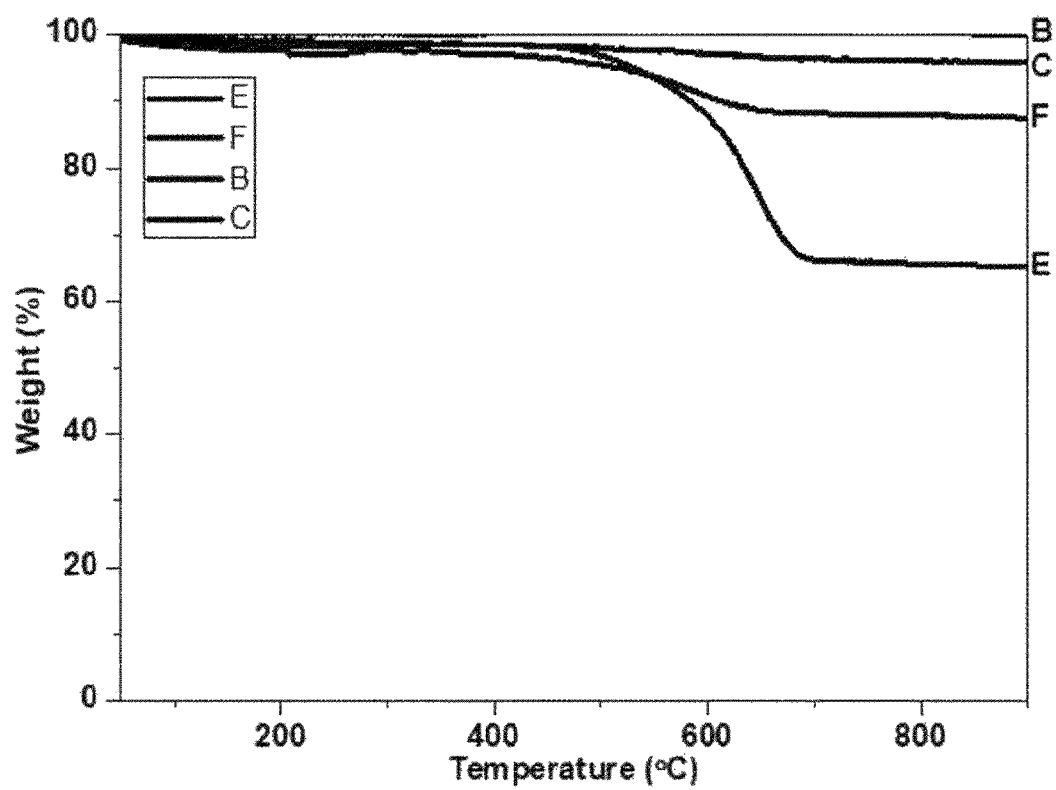

[Figure 9]
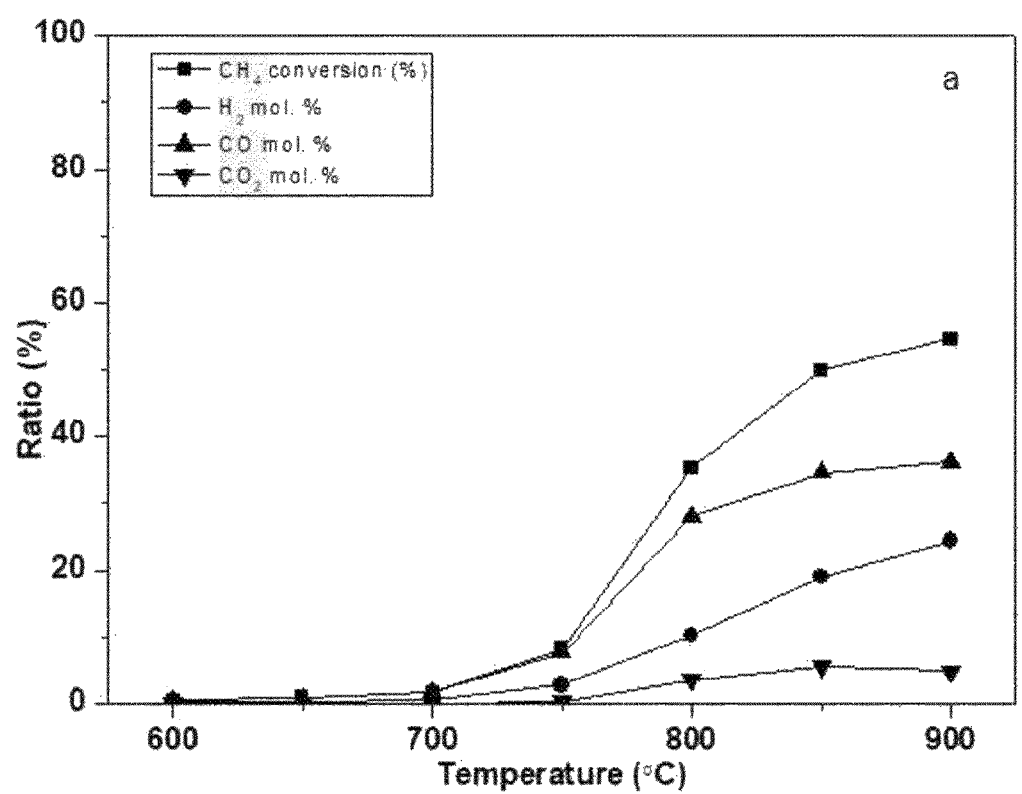

[Figure 10]
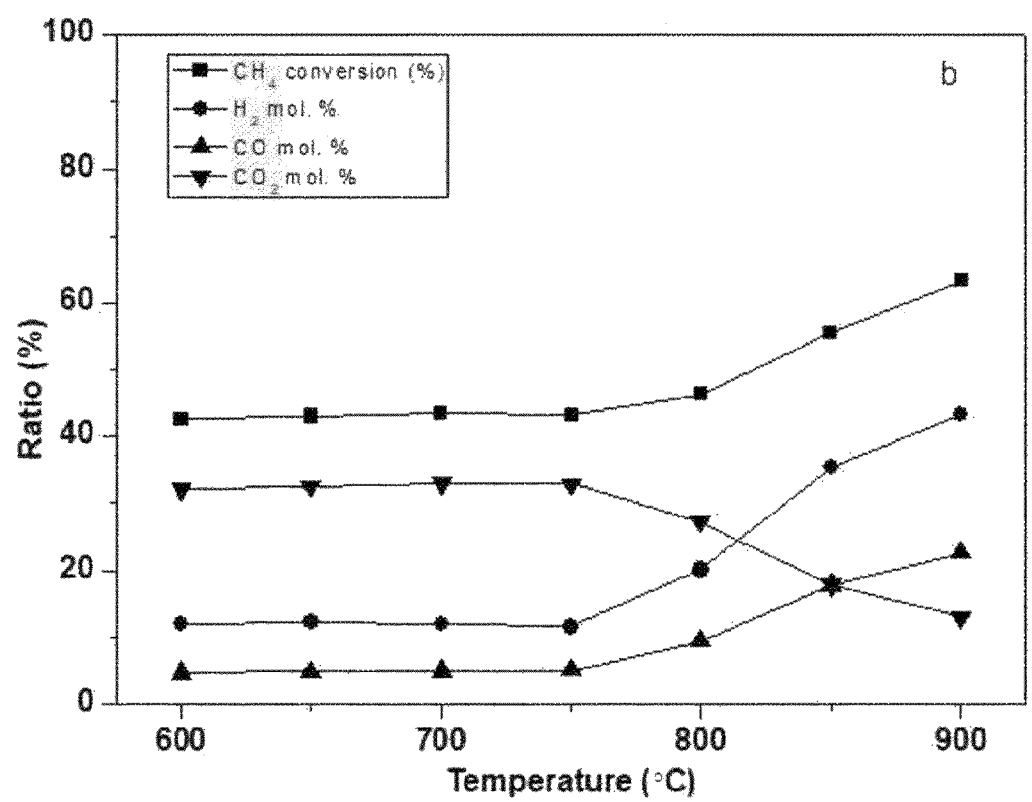

【Figure 11】
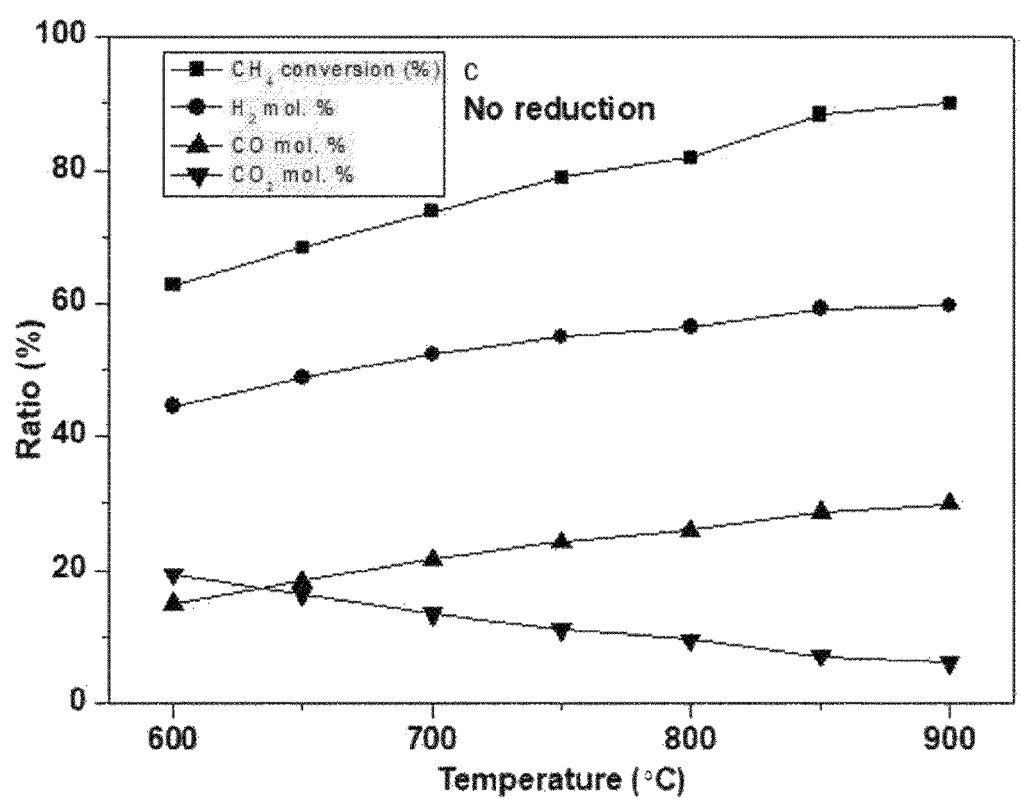

【Figure 12】
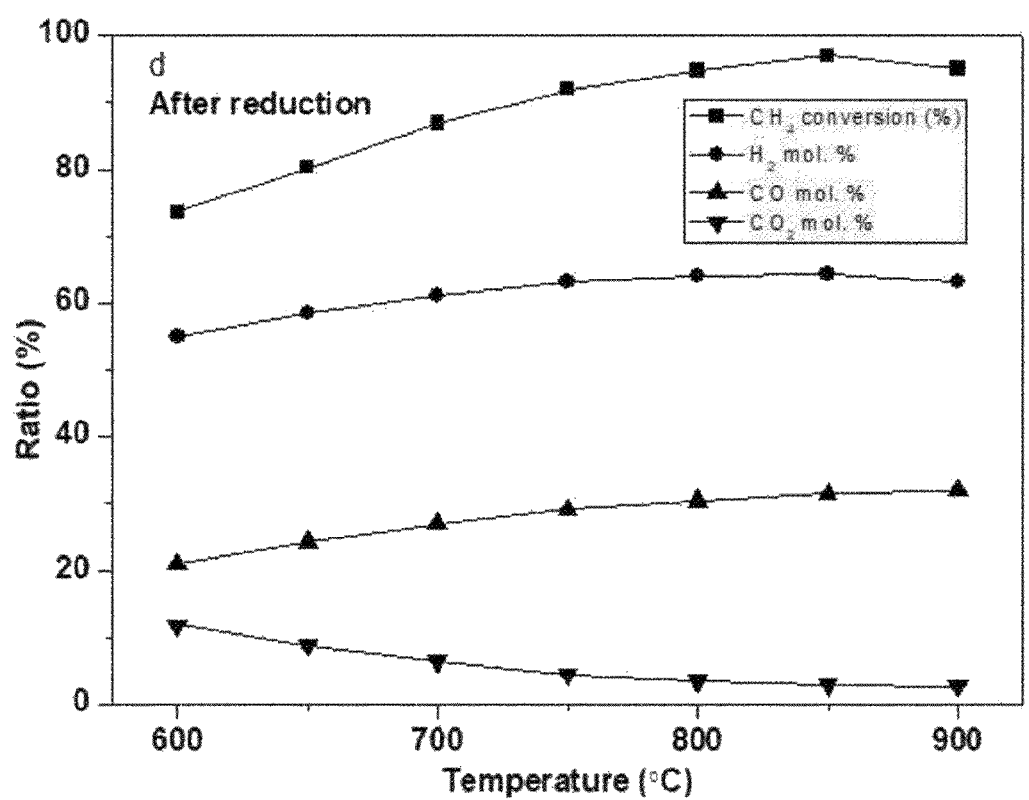

PEROVSKITE METAL OXIDE CATALYST, IN WHICH METAL ION IS SUBSTITUTED, FOR REDUCING CARBON DEPOSITION, PREPARATION METHOD THEREFOR, AND METHANE REFORMING REACTION METHOD USING SAME

CROSS-REFERENCE TO RELATED APPLICATIONS

This application is the U.S. National Phase under 35 U.S.C. § 371 of International Application No. PCT/KR2017/012452, filed on Nov. 6, 2017, which in turn claims the benefit of Korean Application No. 10-2017-0119442, filed on Sep. 18, 2017, the disclosures of which are incorporated by reference into the present application.

TECHNICAL FIELD

The present invention relates to a perovskite metal oxide catalyst substituted with nickel, cobalt, and iron ions for reducing carbon deposition, a method for producing the same, and a process for performing a methane reforming reaction using this catalyst. According to the present invention, a novel type of catalyst is produced in which Ni in ionic foam is substituted at a portion of the Ti site (B-site) of the multicomponent metal oxide $SrTiO_3$ having a perovskite ($ABO_3$) structure. Moreover, various methane reforming reactions (e.g., steam-methane reforming (SMR), dry reforming of methane (DRM), catalytic partial oxidation of methane (CPOM), etc.) are efficiently and economically performed using this catalyst.

BACKGROUND ART

Methane reforming reaction refers to a reaction that produces a synthetic gas (syngas) composed of hydrogen ($H_2$) and carbon monoxide (CO) by reacting methane ($CH_4$) with steam ($H_2O$), carbon dioxide ($CO_2$), or oxygen ($O_2$). From the syngas produced through this reforming reaction, high-purity hydrogen can be produced through an additional water-gas shift reaction, various hydrocarbons can be produced using a (Fischer-Tropsch, hereinafter referred to as 'F-T') process, and alcohols, such as methanol, ethanol, butanol, etc., can also be synthesized using a suitable catalyst such as Cu—ZnO—$Al_2O_3$. That is, various chemical products can be produced using syngas as raw materials.

Methane reforming reaction capable of producing this syngas can be largely classified into three types as follows.

The first type is a steam methane reforming (SMR) reaction as follows.

$$CH_4 + H_2O \rightarrow CO + 3H_2 \quad (1)$$

The above reaction is a typical methane reforming reaction for producing syngas, is performed using nickel-loaded alumina as a catalyst, and has already been commercialized. Since it is a typical endothermic reaction, external heat needs to be efficiently supplied so that the reaction is continuously maintained.

The second type of reforming reaction may be a dry reforming of methane (DRM) reaction, which uses $CO_2$ instead of water as an oxidizing agent, unlike the SMR reaction. The DRM reaction is an endothermic reaction, like the SMR reaction, and the enthalpy of the DRM reaction is slightly greater than the enthalpy of the SMR reaction. During the reaction, carbon deposition occurs very quickly, leading to rapid deactivation of the catalyst. Since this reaction is similar to the SMR reaction, it has received a lot of attention but has not yet been commercialized because there is no suitable catalyst.

$$CH_4 + CO_2 \rightarrow 2CO + 2H_2 \quad (2)$$

The third type of reforming reaction may be a catalytic partial oxidation of methane (CPOM) reaction.

$$CH_4 + \tfrac{1}{2}O_2 \rightarrow CO + 2H_2 \quad (3)$$

Since this CPOM reaction is exothermic, unlike the SMR and DRM reactions described above, process considerations for effectively supplying external heat compared to the endothermic reactions need not to be taken into account. The CPOM reaction shows high methane conversion and syngas selectivity even at very high space velocity. That is, the CPOM reaction has advantages in terms of thermodynamics and kinetics.

However, the SMR, DRM and CPOM reactions, which are methane-reforming reactions that produce hydrogen or syngas using methane, have the following problems.

In the case of the SMR reaction, to use the catalyst stably for a long time (more than two years), excess $H_2O$ needs to be added to prevent carbon deposition. That is, in order to prevent carbon deposition on the reaction catalyst, the feed ratio between water and methane ($H_2O/CH_4$), which are reactants, needs to be maintained at 3.0 or more. Namely, since the catalyst can be stably used for a long time only when the water-to-methane feed ratio is maintained at a high level, a large amount of energy is consumed to evaporate excess water having a very high latent heat of evaporation and use the water as a reactant.

It is known that when methanol is synthesized from methane or hydrocarbons are produced using a constructed F-T (Fisher Tropsch) process, a syngas production process is the most expensive process and accounts for about 60% or more of the investment cost of the entire process. Therefore, to produce useful chemical products from methane, it is necessary to increase the energy efficiency of the SMR process in order to reduce the investment cost of the methane reforming process for producing syngas or improve the economic efficiency. As the most effective way for this purpose, maintaining the water-to-methane feed ratio ($H_2O/CH_4$) at a low level of less than 3.0 (2.0, 1.0, or less) may be considered.

To this end, it is required to develop a catalyst which is not deactivated by carbon deposition thereon even when the water-to-methane feed ratio ($H_2O/CH_4$) is maintained at a low level.

In the case of the DRM reaction, since carbon dioxide is used instead of steam, energy consumption in the DRM reaction is lower than that in the SMR reaction, and thus operating costs may be reduced. However, a phenomenon in which carbon is deposited on the catalyst surface under process operating conditions occurs very quickly, leading to rapid deactivation of the catalyst. A catalyst overcoming this catalytic deactivation has not yet been developed; thus, the DRM reaction has not been commercialized yet.

Catalysts currently being studied for application to the DRM reaction are nickel-based catalysts or precious metal-based catalysts used in the conventional SMR reaction. Carbon deposition on the nickel-based catalysts has been suppressed using various additives or special supports, but the carbon deposition has not yet been completely overcome.

In the case of the precious metal-based catalysts, carbon deposition thereon is known to be suppressed, but high precious metal prices and the catalytic deactivation caused by the agglomeration of precious metal active materials due to long-term use still remain problems.

Although the CPOM reaction has advantages in terms of thermodynamics and kinetics, as described above, the CPOM reaction is still challenging to commercialize. This is because catalysts that are used in the CPOM reaction are mainly based on expensive precious metals as active materials, which cause an increased price burden.

In addition, since the reaction occurs at a high conversion rate and a high space velocity, a very high temperature is partially formed at a portion of the surface of the CPOM catalyst, and thus agglomeration of catalytically active materials or carbon deposition occurs, resulting in a decrease in syngas selectivity.

If the high temperature is maintained while the syngas selectivity decreases, complete combustion occurs by a reaction between fed oxygen and methane, resulting in the production of thus $CO_2$ and $H_2O$, and hence syngas cannot be obtained. In addition, problems associated with the stability of the process may also occur due to a rapid increase in reactor temperature.

Therefore, in order to commercialize the CPOM reaction, it is still necessary to develop a catalyst whose selectivity for syngas is maintained for a long time while being stable at high temperatures.

From the viewpoint of catalysts, in particular, in combined reforming reactions which are a combination of the DRM or DRM reaction and the SMR reaction, catalysts, in which metallic Ni is loaded on a $Ce_2O_3$ support and small amounts of precious metals such as Pt and Rh are additionally loaded, show activity. The catalytic active site in the SMR or DRM reaction is understood to be metallic Ni, and based on this fact, catalysts have been designed. Some perovskite metal oxides are used as a kind of catalyst precursor. For example, $LaNiO_3$ has a typical perovskite structure of $ABO_3$. However, when $LaNiO_3$ is reduced to activate the catalyst, it is changed to a form in which the metallic Ni is loaded on the $La_2O_3$ support. The metal oxide having the perovskite structure is used as a precursor for catalyst production, but the structure of the final reaction catalyst is not the metal oxide having the perovskite structure. The purpose of using such a perovskite precursor is because the metallic Ni having a very small size is uniformly distributed on the $La_2O_3$ support.

DISCLOSURE

Technical Problem

The present invention intends to solve the above-described problems of the SMR, DRM, and CPOM reactions which are methane reforming reactions that produce hydrogen or syngas using methane, and to provide a catalyst in which a perovskite metal oxide is substituted with nickel, cobalt, or iron ions to reduce carbon deposition, a method for producing the same, and a method for performing a methane reforming reaction using the same.

Technical Solution

One embodiment of the present invention may include a perovskite metal oxide catalyst substituted with metal ions for reducing carbon deposition, specifically a multicomponent metal oxide catalyst in which nickel, iron, or cobalt in ionic form is substituted in the lattice structure of the catalyst and which has a perovskite lattice structure. The multicomponent metal oxide having the perovskite structure is preferably $MgTiO_3$, $CaTiO_3$, $BaTiO_3$, or $SrTiO_3$, most preferably $SrTiO_3$. The nickel in ionic form is preferably substituted at the Ti site (B-site) of $MgTiO_3$, $CaTiO_3$, $BaTiO_3$, or $SrTiO_3$, which is a multicomponent metal oxide having a perovskite ($ABO_3$) structure. In addition to Ni, if Co, Fe, or like is substituted, like Ni, an appropriate reaction is possible.

The above-described catalyst may be represented by the following formula (1), more specifically, the following formula (2):

$SrTi_{1-x}Ni_xO_{3-\delta}$            Formula (1)

(wherein x is 0<x<0.05, and δ is 0<δ<0.1)

$SrTi_{0.97}Ni_{0.03}O_{3-\delta}$            Formula (2)

(wherein δ is 0.06)

Another embodiment of the present invention may include a method for producing a multicomponent metal oxide catalyst having a perovskite lattice structure, the method including: a step of mixing and stirring any one or more first metal precursors, selected form the group consisting of a strontium precursor, a magnesium precursor, a calcium precursor and a barium precursor, citric acid, and ethylene glycol at a molar ratio of 0.1:0.4:0.9 in distilled water in a temperature range of 50 to 90° C., thereby preparing a first mixture solution; a step of mixing and stirring a titanium precursor and a second metal precursor in anhydrous ethanol in a temperature range of to 90° C., thereby preparing a second mixture solution; a reaction step of mixing the first mixture solution and the second mixture solution, followed by stirring in a temperature range of 50 to 90° C. for about 24 hours; a step of removing the solvent through a drying step after the reaction step; a first calcination step of calcining a solid-state material, obtained through the drying step, in a temperature range of about 300 to 400° C. under an oxygen atmosphere; and a second calcination step of calcining the solid-state material in a temperature range of about 800 to 1,000° C. under an oxygen atmosphere after the first calcination step, wherein the ratio of the sum of the moles of Ti and the second metal, which are contained in the titanium precursor and the second metal precursor, respectively, to the moles of the first metal contained in the first metal precursors, is maintained at 1:1, so that the second metal in ionic form is substituted in the perovskite lattice structure.

The first metal precursors are preferably the strontium precursor, the magnesium precursor, the calcium precursor, and the barium precursor, more specifically, strontium nitrate, magnesium nitrate, calcium nitrate, and barium nitrate.

In addition, the titanium precursor that is used in the present invention may be titanium(IV) isopropoxide, and the second metal precursor is more preferably nickel(II) nitrate hexahydrate, Cobalt nitrate hexahydrate or iron nitrate nonahydrate.

The first calcination may be performed under the calcination conditions of a temperature rising time of 1 hour and 10 minutes and highest temperature-keeping time of 5 hours, and the second calcination may be performed under the calcination conditions of a temperature rising time of 4 hours and the highest temperature-keeping time of 5 hours.

Still another embodiment of the present invention may include a methane reforming process including performing a methane reforming reaction using the multicomponent metal oxide catalyst described above or the multicomponent metal oxide catalyst produced by the production method described above, wherein the methane reforming reaction may be any one of steam methane reforming (SMR) reaction, a dry reforming of methane (DRM) reaction, and a catalytic partial oxidation of methane (CPOM) reaction.

Advantageous Effects

The nickel-impregnated perovskite metal oxide catalyst with reduced carbon deposition, according to the present invention, has a useful advantage when used in a methane reforming reaction (the SMR, DRM, or CPOM reaction, etc.).

In the case of the SMR reaction, excess steam is used to prevent carbon deposition on the catalyst. For this reason, much energy is consumed for steam production and increases the operating cost. However, when the multicomponent metal oxide having a perovskite ($ABO_3$) structure according to the present invention is used as a catalyst, particularly when a catalyst in which a portion of $Ti^{4+}$ constituting the B-site in the lattice structure of $SrTiO_3$ (hereinafter referred to as 'STO') is substituted with Ni', is used (for example, 3%, i.e., $SrTi_{0.97}Ni_{0.03}O_{3-\delta}$), the SMR reaction may be stably performed without carbon deposition even when the steam/carbon ratio during the reaction is reduced to 0.5. That is, the SMR reaction which is an endothermic reaction may be stably maintained without having to use excess steam during the reaction. Thus, the energy efficiency can be effectively increased.

Although the DRM reaction has a problem in that catalyst deactivation occurs significantly faster than that in the SMR reaction, it is expected that the operating cost of the DRM reaction will be 20% cheaper than the operating cost of the SMR reaction.

Therefore, when the multicomponent metal oxide having a perovskite ($ABO_3$) structure according to the present invention is used as a catalyst, particularly when a catalyst, in which a portion of $Ti^{4+}$ constituting the B-site in the lattice structure of $SrTiO_3$ (hereinafter referred to as 'STO') is substituted with $Ni^{2+}$, is used (for example, 3%, i.e., $SrTi_{0.97}Ni_{0.03}O_{3-\delta}$), no carbon deposition occurs, and thus DRM reaction can be stably maintained, like the SMR reaction, and commercialization of the DRM reaction is possible.

When the DRM reaction is commercialized using the catalyst according to the present invention as described above, there are effects in that the operating cost can be reduced by at least 20% compared to the operating cost of the already commercialized conventional SMR reaction and syngas can also be effectively produced at low process costs.

In addition, this DRM reaction also has the effect of reducing greenhouse gases because it can chemically produce useful syngas using $CH_4$ or $CO_2$ gas, which is a representative gas that causes greenhouse gases, as a reactant.

In the case of the CPOM reaction, the decrease in catalytic performance by carbon deposition does not generally occur, because the reactants contain oxygen. However, precious metal or metallic nickel is used as catalytic active sites. Hence, Hence, when the CPOM reaction is performed at a high temperature of 900° C. or above for a long time, a problem arises in that agglomeration of the catalytic active sites occurs. Thus the selectivity of the catalyst for syngas decreases and the temperature of the CPOM reactor increases rapidly.

However, since the multicomponent metal oxide catalyst having a perovskite ($ABO_3$) structure, according to the present invention, is a material that is synthesized mainly at a high temperature of 900 to 1,200° C., the catalyst has an advantage in that it is very stable at high temperatures, allowing the CPOM reaction to being stably maintained for a long time.

DESCRIPTION OF DRAWINGS

FIG. 1, FIG. 2, FIG. 3 and FIG. 4 show the results of observing the X-ray diffraction patterns of the catalysts according to the present invention as a function of the diffraction angle (FIG. 1: $STO_3$, FIG. 2: $ST_{0.97}N_{0.03}O_{3-\delta}$, FIG. 3: $ST_{0.95}N_{0.05}O_{3-\delta}$, and FIG. 4: $ST_{0.93}N_{0.07}O_{3-\delta}$).

FIG. 5 shows temperature programmed reduction curves of the catalysts according to the present invention.

FIG. 6 shows the results of observing time-dependent changes in $CH_4$ conversion when the SMR reaction was performed using the catalysts according to the present invention.

FIG. 7 shows the results of observing time-dependent changes in $CH_4$ and $CO_2$ conversion when the DRM reaction was performed using the catalysts produced in the present invention.

FIG. 8 shows the results of performing thermogravimetric analysis to analyze the amount of carbon deposition after recovering various catalysts (10 wt % Ni/alumina (sample E), 10 wt % Ni/0.5 wt % Ru/5 wt % Mg/alumina (sample F), Experimental Example 1 (sample B), and Experimental Example 2 (sample C)) used in the DRM reaction.

FIG. 9, FIG. 10, FIG. 11 and FIG. 12 show the results of measuring changes in $CH_4$ conversion (FIG. 9) and the yields of $H_2$ (FIG. 10), CO (FIG. 11), and $CO_2$ (FIG. 12) depending on the reaction temperature when the CPOM reaction was performed using the catalysts produced in the present invention.

MODE FOR INVENTION

Hereinafter, preferred embodiments of the present invention will be described in detail with reference to the accompanying drawings. In addition, the terms or words used in the present specification and the claims should not be construed as being limited to ordinary or dictionary meanings, but should be interpreted based on the meanings and concepts corresponding to technical aspects of the present invention.

Throughout the specification, it is understood that when any part is referred to as "including" any component, it does not exclude other components, but may further include other components, unless otherwise specified.

The following drawings attached to the specification illustrate preferred examples of the present invention by example, and serve to enable technical concepts of the present invention to be further understood together with a detailed description of the present invention, and therefore, the present invention should not be interpreted only with the particulars described in such drawings.

In order to fully understand the present invention, the operational advantages of the present invention, and the objects achieved by the practice of the present invention, reference should be made to the accompanying drawings which illustrate preferred embodiments of the present invention and the contents described in the accompanying drawings.

Hereinafter, the present invention will be described in detail by explaining preferred embodiments of the present invention with reference to the accompanying drawings. However, in the following description of the present invention, a detailed description of already known functions or configurations will be omitted to clarify the gist of the present invention.

Catalysts used in conventional methane reforming reactions, such as SMR, DRM, and CPOM reactions, use metallic nickel or precious metals as catalytic active sites. Still, such precious metals have a price or scarcity problem. For this reason, in the present invention, nickel is used as a catalyst.

From the thermodynamic point of view, a carbon deposition reaction on metallic nickel inevitably occurs under methane reforming reaction conditions. In particular, since the reaction proceeds at a high temperature between 700 and 1000° C., it is very difficult to suppress the agglomeration of nickel or precious metals which are catalytically active materials.

Accordingly, in order to overcome catalytic deactivation that occurs due to carbon deposition or the agglomeration of active materials, the present invention intends to provide a catalyst having a new form and structure, a method for producing the same, and a process for reforming methane using the same.

In the present invention, a multicomponent metal oxide having a perovskite ($ABO_3$) structure was used as a catalyst. In particular, a catalyst was produced in which only a portion of the perovskite lattice structure was substituted with nickel in ionic form ($Ni^{2+}$), not in metallic form ($Ni^0$). That is, the structure of the catalyst was designed such that nickel ions ($Ni^{2+}$) substituted at the B-site of the multicomponent metal oxide having the perovskite structure would serve as active sites, and the multicomponent metal oxide $SrTiO_3$ ($STO_3$) having a typical perovskite structure was used. $MgTiO_3$, $CaTiO_3$, and $BaTiO_3$ may also be used in the same manner, because they have a perovskite structure, like $SrTiO_3$ ($STO_3$).

When a portion of tetravalent titanium ions ($Ti^{4+}$) located at the B-site of the lattice structure in the multicomponent metal oxide $STO_3$ having the perovskite structure is substituted with divalent $Ni^{2+}$, a portion of anionic oxygen ions ($O^{2-}$) should leave the lattice in order to maintain charge neutrality. Therefore, it is considered that $Ni^{2+}$ ions in the catalyst according to the present invention are not typical B-site cations bonding to six oxygen ions, but are kept in a state of having a coordination number lower than six, and $Ni^{2+}$ ions are kept in a state of having a coordination number lower than six without being saturated, and thus the catalyst exhibits catalytic activity. In addition, $Ni^{2+}$, $Co^{2+}$, $Fe^{2+}$, $Co^{3+}$, $Fe^{3+}$, or the like may also be substituted in the same manner and used as catalytic active sites.

Various methane reforming reactions were performed using such catalysts according to the present invention. In the case of the SMR reaction, under reaction conditions (steam/carbon=3.0; reaction temperature (T)=700° C.; and weight hourly space velocity (WHSV, mL/g-catalyst/hour)= 3,000 $h^{-1}$) similar to existing commercial operating conditions, a long time is taken until catalyst deactivation by carbon deposition occurs. For this reason, in order to quickly examine the resistance of each catalyst to carbon deposition within a shorter time, accelerating conditions (steam/carbon=0.5; T=700° C.; and WHSV=6,000 $h^{-1}$) were used in which a lot of carbon deposition occurred.

After the reaction, the degree of carbon deposition on each of the catalysts was analyzed by theimogravimetric analysis (TGA) in order to examine the degree of resistance of each catalyst to carbon deposition.

The DRM reaction is generally performed at high temperatures (800 to 900° C.) under a condition in which methane is less than carbon dioxide, such as $CH_4:CO_2$=0.9: 1.0, in order to prevent carbon deposition. However, in the present invention, in order to examine the carbon deposition resistance of each catalyst under more accelerating conditions, the DRM reaction was performed at T=800° C. under $CH_4:CO_2$=1.0:0.9, which is a condition in which methane is more than carbon dioxide.

The CPOM reaction was performed under the conditions of WHSV=20,000 $h^{-1}$, T=600 to 900° C., and $CH_4:O_2$=1: 0.5, and after the reaction, the degree of carbon deposition was measured by thermogravimetric analysis (TGA).

[Example 1] Synthesis of $Sr_1Ti_{1-y}Ni_yO_{3-\delta}$ Catalyst Having Perovskite ($ABO_3$) Structure Step 1) 0.1 mol of strontium nitrate (99.0%, Sigma Aldrich) was completely dissolved in 200 mL of distilled water under stirring at a temperature of 70° C., and then 0.4 ml of citric acid (99%, Sigma Aldrich) and 0.9 mol of ethylene glycol (99%) were added thereto and completely dissolved, thereby preparing a first mixture solution.

Step 2) 0.100 to 0.093 mol of titanium(IV) isopropoxide (97%, Sigma Aldrich) and 0.000 to 0.007 mol of nickel(II) nitrate hexahydrate (97%) (provided that Ti+Ni=0.1 mol) were added to and completely dissolved in 200 mL of anhydrous ethyl alcohol (99.9%, Daejung, 99.9%) under stirring at a temperature of 70° C., thereby preparing a second mixture solution.

Step 3) The first mixture solution was added slowly to and mixed with the second mixture solution, and then stirred for about 24 hours while the temperature was kept at about 70° C.

Step 4) Thereafter, the solvent was removed entirely by drying at 100° C. for 24 hours, thereby obtaining solid-state particles.

Step 5) The obtained solid-state particles were subjected to the first calcination at a temperature of 350° C. (a temperature rising time of 1 hour and 10 minutes and a keeping time of 5 hours) under an oxygen atmosphere.

Step 6) After the first calcination, the solid-state particles were subjected to the second calcination at a temperature of 900° C. (a temperature rising time of 1 hour and 10 minutes and a keeping time of 5 hours) under an oxygen atmosphere, thereby producing a $SrTi_{1.00\ to\ 0.93}Ni_{0.00\ to\ 0.07}O_{3-\delta}$ catalyst.

The catalyst particles produced through Steps 1 to 6 above were classified as shown in Table 1 below, and synthesized in the form of each Experimental Example.

TABLE 1

|  | Sample name | Composition ratio |
| --- | --- | --- |
| Comparative Example | Sample A | $STO_3$ ($SrTiO_3$) |
| Experimental Example 1 | Sample B | $ST_{0.97}N_{0.03}O_{3-\delta}$, ($SrTi_{0.97}Ni_{0.03}O_{3-\delta}$, substituted with 3 mol. % Ni) |
| Experimental Example 2 | Sample C | $ST_{0.95}N_{0.05}O_{3-\delta}$, ($SrTi_{0.95}Ni_{0.05}O_{3-\delta}$, substituted with 5 mol. % Ni) |
| Experimental Example 3 | Sample D | $ST_{0.93}N_{0.07}O_{3-\delta}$, ($SrTi_{0.93}Ni_{0.07}O_{3-\delta}$, substituted with 7 mol. % Ni) |

[Example 2] Structural Analysis of Catalyst by XRD

First, strontium titanium oxide ($SrTiO_3$, $STO_3$) corresponding to the Comparative Example 2 was produced without using nickel(II) nitrate hexahydrate (97%) in step 2 of Example 1 above, and then it was confirmed by x-ray diffraction analysis that the strontium titanium oxide had a typical perovskite structure (ABO$_3$), like sample A.

In addition, metal oxides having a perovskite structure were produced as Experimental Examples 1 to 3 by substituting a portion of titanium with nickel while changing the amount of nickel(II) nitrate hexahydrate (97%) in step 2 of Example 1.

As shown in FIGS. 1 to 4, in the case of sample B substituted with 3 mol % of Ni, only the peaks corresponding to a perovskite structure appeared, and the peaks corresponding to nickel oxide (NiO) were not observed. However, in the case of the samples (sample C and sample D) having an increased Ni content of 5 or 7 mol %, it was confirmed that the peaks corresponding to NiO increased as the Ni content increased.

That is, it can be seen that when the Ni content was 3 mol % (y=0.03), Ni was completely substituted at the Ti site of the perovskite lattice structure, but when the Ni content was 5 or 7 mol % (y=0.05 or 0.07) or more, Ni was substituted at the Ti site of the perovskite lattice structure and NiO was also formed independently.

[Example 3] Structural Analysis by TPR

As shown in FIG. 5, for the Comparative Example and Experimental Examples 1 and 2 produced in Example 1 above, the degree of temperature-dependent reduction of each sample was analyzed by TPR (temperature programmed reduction).

In the case of sample A (Comparative Example) substituted with no Ni, it was confirmed that reduction occurred at a temperature between 500 to 700° C., but in the case of sample B (Experimental Example 1) substituted with 3 mol % of Ni instead of Ni, it was confirmed that reduction occurred in a wide temperature range of 300 to 900° C. That is, substitution with Ni increased the degree of reduction, indicating that the number of oxygen vacancies in the perovskite structure increased.

In the case of sample C (Experimental Example 2) substituted with 5 mol % of Ni instead of Ti, a wide peak was observed at a temperature between 200 to 800° C., and this is believed to be because up to 3 mol % of Ni was substituted for Ti in the perovskite structure, but the remaining Ni was present in the form of NiO outside the structure, and thus reduction of the NiO occurred, and hence the wide H$_2$ absorption peak was observed. In particular, the peak between 200 and 400° C. and the sharp peak at around 400° C. are considered to correspond thereto.

[Example 4] Experiment on Methane Reforming Reactions (1) Steam Methane Reforming Reaction The synthesized catalysts of Comparative Example 1 and Experimental Examples 1 and 2 were subjected to a reduction process at a temperature of 700° C. (a temperature rising time of 2 hours and minutes and a keeping time of 2 hours) under a condition of 10 vol % H$_2$/N$_2$ [space velocity (SV) =30,000 mLg$^{-1}$ h$^{-1}$], and then a steam methane reforming (SMR) reaction was performed while controlling the amount of steam fed. Specific SMR reaction conditions are as follows.

Reaction temperature: 700° C.; H$_2$O/CH$_4$ (steam/carbon)=0.5;

SV=6,000 mLg$^{-1}$ h$^{-1}$, and the particle size of each catalyst sample charged into the fixed-bed reactor=100 to 200 μm After the SMR reaction, the degree of carbon deposition on each of the catalysts was measured by theimogravimetric analysis (TGA), and the change in the weight of each catalyst was measured while rising the temperature from 50° C. to 900° C. at a rate of 10° C./min under an air atmosphere.

In a commercialized SMR reaction, a steam-to-carbon ratio of 3.0 or more (S/C≥3.0) is generally used in order to prevent carbon from being deposited on the catalyst, but in this Example, the SMR reaction was performed under a condition of S/C=0.5 so that carbon deposition formed on the catalyst would occur rapidly.

As shown from the results in FIG. 6, it can be seen that when sample A (Comparative Example), in which no Ni' was substituted at the B-site and which was composed purely of SrTiO$_3$, was used as the catalyst, no methane conversion was observed (CH$_4$ conversion=0%), but for samples B and C corresponding to the samples of Experimental Examples 1 and 2, respectively, a methane conversion of about 50% could be observed. This means that the STO$_3$ perovskite structure itself has no catalytic active site for the methane reforming reaction, and it can be seen that the substituted Ni$^{2+}$ is the active site of the catalyst.

In general, under accelerating conditions (such as S/C=0.5) in which carbon deposition easily occurs, resulting in a decrease in the catalyst life, deactivation of the catalyst proceeds rapidly. Table 2 below summarizes the results of measuring the amount of carbon deposition after recovering the catalysts used in the reaction under such accelerating conditions. As shown therein, when the SRM reaction was performed under the accelerating conditions in which carbon deposition was easy to occur, in the case in which a catalyst including metallic nickel dispersed on an alumina support (10 wt % Ni/alumina) was used, the activity of the catalyst decreased rapidly within 2 hours and severe carbon deposition occurred.

The addition of 0.5 wt % Ru and 5 wt % Mg to the 10 wt % Ni/alumina catalyst greatly reduced the amount of carbon deposition but did not completely prevent carbon deposition. Sample A substituted with no Ni had no activity for methane conversion and no carbon deposition, but in the case of sample B (Experimental Example 1) and sample C (Experimental Example 2) substituted with 3% Ni and 5% Ni, respectively, the methane conversion rate was constantly kept at 50%.

TABLE 2

| Kind of sample | Whether carbon deposition (coke production) occurred | |
|---|---|---|
| | SMR reaction (S/C = 0.5, 5 hr) | DRM reaction (50 hr) |
| 10 wt % Ni/alumina (sample E) | Very much produced | Very much produced |
| 10 wt % Ni/0.5 wt % Ru/5 wt % Mg/alumina (sample F) | Little produced | Little produced |
| Comparative Example (sample A) | Not produced (not reactive) | Not produced (not reactive) |
| Experimental Example 1 (sample B) | Not produced at all | Not produced at all |
| Experimental Example 2 (sample C) | Very little produced | Very little produced |

In this Example, steam was fed in an amount corresponding to only half of methane, and thus the maximum methane conversion was 50%. In view of this fact, when sample B and sample C were used as catalysts, a methane conversion of 50% was stably maintained for about 5 hours even under accelerating conditions (in which the catalyst activity decreased rapidly and carbon deposition occurred more easily (see FIG. 6).

After the SMR reaction, the reduction in weight of each of the sample used as catalyst was measured while rising the temperature under an air atmosphere, thereby measuring the amount of carbon deposition (TGA experiment). In the case of sample A, it is considered that there was no carbon deposition because the SMR reaction did not occur. Sample B substituted with 3 mol % of Ni had activity for SMR reaction, and under accelerating conditions, there was no carbon deposition on sample B while the catalytic activity of sample B did not decrease.

Sample C substituted with 5 mol % Ni was also stable in the SMR reaction, but it was confirmed by the TGA experiment that there was some carbon deposition on sample C (see FIG. 3 and Table 2). Sample C showed a mass loss of about 3% through the TGA experiment, and this is believed to be because carbon deposition occurred due to the NiO located outside the structure. From these experimental results, it can be seen that Ni substituting for a portion of Ti in the perovskite lattice structure acts as an active site for the SMR reaction. In the case of sample C having NiO formed thereon, there was carbon deposition, but in the case of sample B in which NiO was not formed independently and all $Ni^{2+}$ were located in the lattice structure, no carbon deposition occurred. From this, it can be expected that if a catalyst in which all $Ni^{2+}$ are located in the lattice structure is produced, deactivation of the catalyst by carbon deposition can be fundamentally solved because carbon deposition on the catalyst does not occur.

(2) Dry Reforming of Methane (DRM) Reaction

The synthesized catalysts were subjected to a reduction process by heating to a temperature of 800° C. (a temperature rising time of 2 hours and 40 minutes and a keeping time of 2 hours) under a condition of 10 vol % $H_2/N_2$ (space velocity (SV)=30,000 $mLg^{-1} h^{-1}$), and then a dry reforming of methane (hereinafter referred to as DRM) reaction was performed under the following conditions.

Reaction temperature: 600, 700, 800, or 900° C.,
$CH_4:CO_2:N_2=1.0:0.9:1.0$,
SV=5,000, 10,000, 20,000 or 30,000 mL $g^{-1} h^{-1}$, and
pellet size=100 to 200 lam After the reaction, the degree of carbon deposition on each catalyst was measured in the same manner as the case of the above-described SMR reaction. The specific reaction results are shown in FIG. 4.

As shown in FIG. 7, even in the case of the DRM reaction, each of the catalysts exhibited a tendency similar to that in the SMR reaction described above. Sample A substituted with no Ni did not show any activity for the DRM reaction, but the samples (samples B and C) substituted with 3% Ni and 5%, respectively, showed relatively catalytic activities, and the initial activities thereof were stably maintained for about 50 hours.

After various catalysts used in this DRM reaction were recovered, the amount of carbon deposited thereon was analyzed by TGA, and the results are shown in FIG. 8. On sample B (Experimental Example 1; $SrTi_{0.97}Ni_{0.03}O_{3-\delta}$) substituted with 3 mol % of Ni, no carbon deposition occurred, but on sample C (Experimental Example 2; $SrTi_{0.95}Ni_{0.05}O_{3-\delta}$) substituted with 5 mol %, carbon deposition occurred in a very small amount of about 4%. In the case of the catalyst (sample E) in which metallic nickel was supported on alumina, a very large amount of carbon was deposited (about 40% of the recovered catalyst was identified as deposited carbon).

In the case of the samples produced in the present invention, particularly sample B ($ST_{0.97}N_{0.03}O_{3-\delta}$), it was confirmed that no carbon deposition occurred even under conditions in which very severe carbon deposition on common catalysts occurs. This means that $Ni^{2+}$ substituted in the lattice acts as a catalytic active site that selectively converts methane into syngas. In addition, it can be seen that when NiO is formed outside the perovskite lattice structure by adding excess $Ni^{2+}$, it is reduced into metallic $Ni^0$ under DRM reaction conditions, thus simultaneously causing carbon deposition and a reforming reaction.

(3) Catalytic Partial Oxidation of Methane (CPOM) Reaction

Each of the catalysts shown in Tables 1 and 2 above was subjected to a calcination process at a temperature of 600° C. (a temperature rising time of 2 hours and a keeping time of 2 hours) under a $N_2$ condition (space velocity (SV)=30,000 $mLg^{-1} h^{-1}$), and then a catalytic partial oxidation of methane (CPOM) reaction was performed under the following conditions, and the results of the reaction are shown in FIGS. 9 to 12.

Reaction temperature: 600, 650, 700, 750, 800, 850, or 900° C.
$CH_4: O_2=1:0.5$
Space velocity=20,000 $mLg^{-1} h^{-1}$
pellet size=100 to 200 μm As shown in FIGS. 9 to 12, the CPOM reaction was performed under a total of four conditions. (a) represents a blank (catalyst-free condition; FIG. 9), (b) illustrates $STO_3$ (catalyst substituted with no Ni, Comparative Example, sample A, FIG. 10), (c) represents sample B (non-reduced Experimental Example 1, FIG. 11) which was not subjected to the $ST_{0.97}N_{0.03}O_{3-\delta}$ reduction process, and (d) represents sample B (Experimental Example 1 subjected to the reduction process at 600° C. (a temperature rising time of 2 hr and a keeping time of 2 hr, FIG. 12) subjected to the $ST_{0.97}N_{0.03}O_{3-\delta}$ reduction process.

In the blank (see FIG. 9) which is a catalyst-free condition, the reaction did not take place at all up to 700° C., and the reactivity tended to increase as the temperature increased from 750° C. In this case, CO was more than $H_2$, indicating that the CORM reaction did not take place, but the SMR reaction of $H_2O$ and $CH_4$, produced through the combustion reaction, and the reverse water gas shift reaction of $H_2O$ and $CO_2$, did take place.

In the SMR reaction and DRM reaction described above, the $SrTiO_3$ catalyst (Comparative Example; sample A) substituted with no Ni had no effect on the reaction, but in the CPOM reaction, the catalyst showed certain reactivity in the temperature of 600 to 750° C. (see FIG. 10). At this time, a lot of $CO_2$ was produced, and this is believed to be because the combustion reaction was predominant. In addition, it is considered that the reason that the $H_2/CO$ ratio was slightly higher than 2 because the SMR reaction and a low proportion of the CPOM reaction did take place. Then, in the temperature range above 800° C., as the temperature increased, the proportion of $CO_2$ decreased and the proportions of $H_2$ and CO increased. These results can be attributed to the proportion of the combustion reaction decreasing and the proportion of the CPOM reaction increasing.

The results of the reaction performed using Experimental Example 1 (sample B), which showed the most stable behavior in the SMR reaction and DRM reaction as described above, are shown in FIG. 11. In comparison with the case of FIGS. 9 and 10, high reaction activity appeared from low temperatures. In particular, unlike the STO$_3$ catalyst of the Comparative Example on which the combustion reaction was predominant up to 750° C., sample B showed a tendency to produce a lot of H$_2$ and CO even at low temperatures.

However, at 600° C., the H$_2$/CO ratio was much higher than 2 and approached 3. This is believed to be because the SMR reaction with H$_2$O produced by Ni substituted in the catalyst was predominant and the CPOM reaction acted as an additional reaction. However, as the temperature increased, the H$_2$/CO ratio approached 2. This is because the production of H$_2$O decreased as the proportion of the combustion reaction decreased, and the activity of the CPOM became higher as the temperature increased.

FIG. 12 shows the results of performing the CORM reaction using the same catalyst used in FIG. 6c after subjecting the same catalyst to an additional reduction process at 600° C. for 2 hours under a hydrogen atmosphere. As shown therein, the activity of the catalyst was improved compared to that of the catalyst not subjected to the hydrogen reduction process. In particular, at 850° C., the catalyst showed a very high conversion rate of about 97% even at a high space velocity (SV) of 20,000 mLg$^{-1}$ h$^{-1}$.

In the SMR reaction and DRM reaction described above, hydrogen is produced as the reaction proceeds, and thus the reaction itself is a reducing atmosphere reaction. However, in the CPOM reaction, an oxidizing atmosphere and a reducing atmosphere coexist because oxygen is continuously supplied. Thus, it is considered that if the catalyst is not previously reduced, the active site is not completely activated.

It is considered that if the catalyst is subjected to hydrogen reduction treatment, oxygen adsorbed around Ni' substituted in the lattice is completely removed, and thus the activity of the CPOM reaction is further improved from relatively low temperatures. Through these experimental results, it could be seen that Ni$^{2+}$ substituted in the lattice having oxygen vacancies acted as a catalytic active site.

As described above, it is known that metallic Ni can act as an active site for various methane-reforming reactions (SMR, DRM, and CPOM reactions). However, it was experimentally found that Ni substituted at the Ti site (B-site) of SrTiO$_3$ having a perovskite structure, which is provided in the present invention, can act as an active site for various methane reforming reactions (SMR, DRM, and CPOM reactions).

In addition, in reactions such as SMR and DRM reactions, in which carbon deposition significantly affects the long-term stability of catalysts, the catalysts produced in the present invention have resistance to carbon deposition. Accordingly, it is expected that these catalysts can stably maintain their activity for a long time, can reduce the operating cost of the SMR reaction, can reduce the operating cost of the DRM reaction, and can make it possible to commercialize the DRM reaction.

In addition, the catalysts produced in the present invention exhibited high activity for the CPOM reaction and had excellent high-temperature stability. Accordingly, these catalysts are expected to maintain the CPOM reaction for a long time, making it possible to commercialize the CPOM reaction.

The above description of the present invention is exemplary, and those of ordinary skill in the art will appreciate that the present invention can be easily modified into other specific forms without departing from the technical spirit or essential characteristics of the present invention. Therefore, it should be understood that the exemplary embodiments described above are exemplary in all aspects and are not restrictive. For example, each component described to be of a single type can be implemented in a distributed manner. Likewise, components described to be distributed can be implemented in a combined manner.

The scope of the present invention is defined by the following claims rather than the detailed description of the invention. It shall be understood that all modifications and embodiments conceived from the meaning and scope of the claims and their equivalents are included in the scope of the present invention.

INDUSTRIAL APPLICABILITY

The present invention solves the prior art problems of SMR, DRM, and CPOM reactions which are methane reforming reactions that produce hydrogen or syngas using methane, and provides a catalyst in which a perovskite metal oxide is substituted with nickel, cobalt, or iron ions so that carbon deposition thereon can be reduced, a method for producing the same, and a method for performing a methane reforming reaction using this catalyst. Therefore, the present invention is industrially applicable.

The invention claimed is:

1. A multicomponent metal oxide catalyst, wherein,
the multicomponent metal oxide catalyst has a perovskite structure,
the multicomponent metal oxide catalyst is MgTiO$_3$, CaTiO$_3$, BaTiO$_3$, or SrTiO$_3$, wherein the Ti site of the MgTiO$_3$, CaTiO$_3$, BaTiO$_3$, or SrTiO$_3$ is partially substituted with an ionic form of Ni,
the multicomponent metal oxide catalyst has no nickel oxide (NiO), and
the multicomponent metal oxide catalyst is represented by the following Formula (1):

$$MTi_{1-x}Ni_xO_{3-\delta} \qquad \text{Formula (1)}$$

wherein x is 0<x<0.03, δ is 0<δ<0.10, and M is Sr, Mg, Ca, or Ba,
wherein the ionic form of Ni has a coordination number lower than six and an oxidation number of +2, and δ is determined to maintain neutrality of the multicomponent metal oxide catalyst.

2. A methane reforming process comprising performing a methane reforming reaction using the multicomponent metal oxide catalyst of claim 1.

3. The methane reforming process of claim 2, wherein the methane reforming reaction is any one of a steam methane reforming (SMR) reaction, a dry reforming of methane (DRM) reaction, and a catalytic partial oxidation of methane (CPOM) reaction.

4. The multicomponent metal oxide catalyst of claim 1, wherein M is Mg, Ca, or Ba.

5. A method for producing a multicomponent metal oxide catalyst having a perovskite lattice structure, the method comprising:
a step of mixing and stirring a first metal precursor, citric acid, and ethylene glycol at a molar ratio of 0.1:0.4:0.9 in distilled water in a temperature range of 50 to 90° C., thereby preparing a first mixture solution;

a step of mixing and stirring a titanium precursor and a second metal precursor in anhydrous ethanol in a temperature range of 50 to 90° C., thereby preparing a second mixture solution;

a reaction step of mixing the first mixture solution and the second mixture solution, followed by stirring in a temperature range of 50 to 90° C. for about 24 hours;

a step of removing the solvent through a drying step after the reaction step;

a first calcination step of calcining a solid-state material, obtained through the drying step, in a temperature range of about 300 to 400° C. with a highest temperature keeping time of 5 hours under an oxygen atmosphere; and a second calcination step of calcining the solid-state material in a temperature range of about 800 to 1,000° C. with a highest temperature keeping time of 5 hours under an oxygen atmosphere after the first calcination step, wherein the first calcination is performed with a temperature-rising time of 70 minutes and a temperature-maintaining time of 5 hours, and the second calcination is performed with a temperature-rising time of 4 hours and a temperature-maintaining time of 5 hours, wherein the ratio of the sum of the moles of Ti and the second metal, which are contained in the titanium precursor and the second metal precursor, respectively, to the moles of the first metal contained in the first metal precursors, is maintained at 1:1, so that the second metal in ionic form is substituted in the perovskite lattice structure, the first metal precursor is strontium nitrate, magnesium nitrate, calcium nitrate, or barium nitrate, and the second metal precursor is a nickel precursor, wherein, the multicomponent metal oxide catalyst has a perovskite structure, the multicomponent metal oxide catalyst is $MgTiO_3$, $CaTiO_3$, $BaTiO_3$, or $SrTiO_3$, wherein the Ti site of the $MgTiO_3$, $CaTiO_3$, $BaTiO_3$, or $SrTiO_3$ is partially substituted with an ionic form of Ni, the multicomponent metal oxide catalyst has no nickel oxide (NiO), and the multicomponent metal oxide catalyst is represented by the following Formula (1):

$$MTi_{1-x}Ni_xO_{3-\delta} \quad \text{Formula (1)}$$

wherein x is $0<x<0.03$, $\delta$ is $0<\delta<0.10$, and M is Sr, Mg, Ca, or Ba, wherein the ionic form of Ni has a coordination number lower than six and an oxidation number of +2, and $\delta$ is determined to maintain neutrality of the multicomponent metal oxide catalyst.

6. The method of claim 5, wherein the titanium precursor is titanium(IV) isopropoxide.

7. The method of claim 5, wherein the second metal precursor is nickel(II) nitrate hexahydrate.

8. The methane reforming process of claim 5, wherein M is Mg, Ca, or Ba.

* * * * *